(12) United States Patent
Fakhoury et al.

(10) Patent No.: US 6,612,657 B1
(45) Date of Patent: Sep. 2, 2003

(54) OUTBOARD RIBBED WHEEL HUB

(75) Inventors: Omar J. Fakhoury, Rockford, IL (US); William E. Ott, Rockford, IL (US)

(73) Assignee: Gunite Corporation, Rockford, IL (US)

( * ) Notice: Subject to any disclaimer, the term of this patent is extended or adjusted under 35 U.S.C. 154(b) by 0 days.

(21) Appl. No.: 09/703,995

(22) Filed: Nov. 1, 2000

(51) Int. Cl.$^7$ ............................................... B60B 27/00

(52) U.S. Cl. .................. 301/105.1; 301/106; 301/108.5

(58) Field of Search ............................... 301/105.1, 106, 301/107, 108.1, 108.2, 108.3, 108.4, 108.5

(56) References Cited

U.S. PATENT DOCUMENTS

| | | | | | |
|---|---|---|---|---|---|
| 5,281,004 | A | * | 1/1994 | O'Leary, Jr. | 301/105.1 |
| 5,352,026 | A | * | 10/1994 | Snook | 301/105.1 |
| 5,492,391 | A | * | 2/1996 | Snook | 301/105.1 |
| 6,257,678 | B1 | * | 7/2001 | Brookey et al. | 301/105.1 |
| 6,273,519 | B1 | * | 8/2001 | Tsou | 301/108.2 |

* cited by examiner

*Primary Examiner*—S. Joseph Morano
*Assistant Examiner*—Long Bao Nguyen
(74) *Attorney, Agent, or Firm*—Michael Best & Friedrich; Larry L. Saret; Brian J. Lum

(57) ABSTRACT

The present invention relates to a wheel hub having a cylindrical main body and a radial flange, with radial ribs extending between the outboard side of the radial flange and the outboard end of the main body.

10 Claims, 10 Drawing Sheets

OUTBOARD RIBBED WHEEL HUB

FIELD OF THE INVENTION

The present invention relates to an outboard ribbed wheel hub and, especially, to an outboard ribbed wheel hub for use with trucks weighing in a range of 16,001 to 80,000 lbs.

BACKGROUND OF THE INVENTION

Wheel hubs connect the wheel of a vehicle to the axle and, therefore, are subjected to significant compressive stress in bearing the weight of the vehicle. Furthermore, wheel hubs comprise a significant portion of the overall weight of vehicles designed for commercial freight hauling and similar uses. Such commercial vehicles are subject to state and federal regulations that impose restrictions on the overall weight of the loaded vehicle. Thus, any reduction in the weight of the wheel hubs will directly increase the amount of freight that can be hauled by such vehicles. However, the weight of a wheel hub cannot easily be reduced, because the wheel hub must be strong enough to withstand the stress of supporting the vehicle.

Wheel hubs are generally funnel shaped, having a cylindrical main body with a radial flange at one end. The wheel is secured to the radial flange and the axle is received within an axial bore through the main body. The side of the radial flange connected to the wheel is referred to as the outboard side, while the side oriented toward the axle is referred to as the inboard side.

During vehicle use, the compressive force imposed by the weight of the vehicle exerts significant bending stress on the radial flange. To increase the resistance of the radial flange to bending stress, traditional wheel hub designs feature a plurality of ribs positioned along the inboard side of the radial flange. The inboard ribs do not directly support the radial flange against the compressive force imposed by the weight of the vehicle, but merely resist the resulting bending stress by operating like a cantilever beam to strengthen and stiffen the radial flange.

However, compression loads are more efficiently supported than bending loads. Thus, the cantilever arrangement of the inboard ribs is relatively inefficient at supporting the radial flange against compressive force. Consequently, the inboard ribs of traditional wheel hub designs are larger and heavier than necessary to resist the compressive force imposed on the radial flange. Furthermore, the presence of the inboard ribs creates drastic cross-sectional changes in the profile of the radial flange. These drastic cross-sectional changes produce stress concentrations that are susceptible to cracking.

In addition, the axle is subjected to forces that tend to twist the axle away from the axis of rotation within the axial bore. This twisting force can cause deformation of the axial bore within the main body of the wheel hub. The inboard ribbed design of traditional wheel hubs does not provide any support or resistance against deformation of the axial bore caused by twisting of the axle.

Thus, it would be desirable to provide a wheel hub having increased resistance to compressive forces at a reduced weight in comparison to traditional inboard wheel hub designs. In addition, it would be desirable to provide a wheel hub that provides support for the axial bore against twisting of the axle.

SUMMARY OF THE INVENTION

These needs and other needs are satisfied by the present invention which comprises a wheel hub with a cylindrical main body, a radial flange and a plurality of radial ribs. The main body has an outboard end and an inboard end, and the radial flange has an outboard side and an inboard side. The radial flange is connected to and encircles the main body, with the radial ribs extending between the outboard side of the radial flange and the outboard end of said main body. In addition, the profile of the inboard side of said radial flange is a smooth, continuous curve.

DETAILED DESCRIPTION OF THE INVENTION

In accordance with the present invention, a wheel hub has an outboard ribbed structure, which provides superior performance and characteristics in comparison to prior art wheel hub designs. In particular, the structure of the present invention results in superior load bearing characteristics and reduced weight as compared with prior art wheel hubs.

Figure 1:
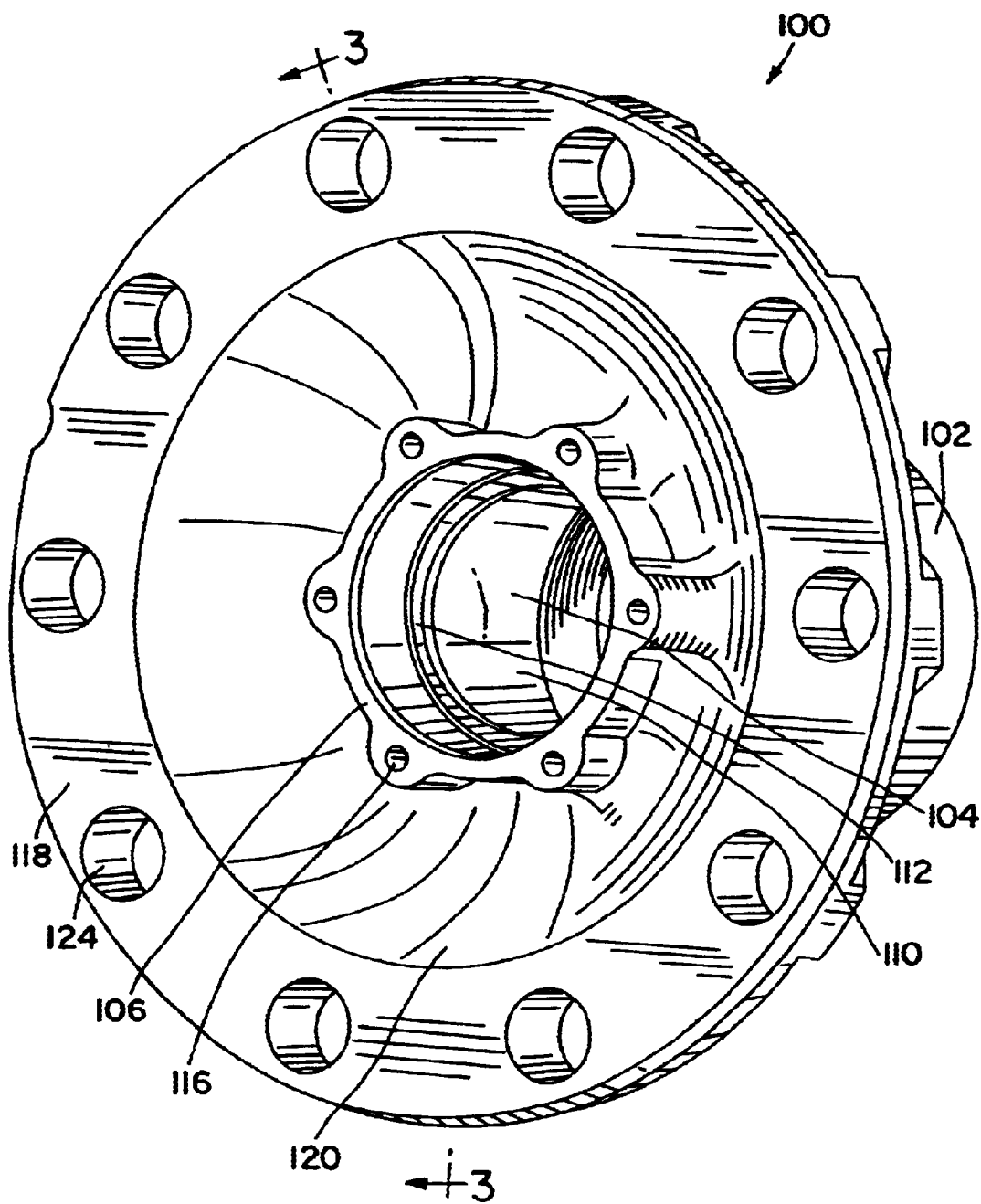
FIG. 1 is a perspective view of the outboard side of a prior art wheel hub.
Figure 2:
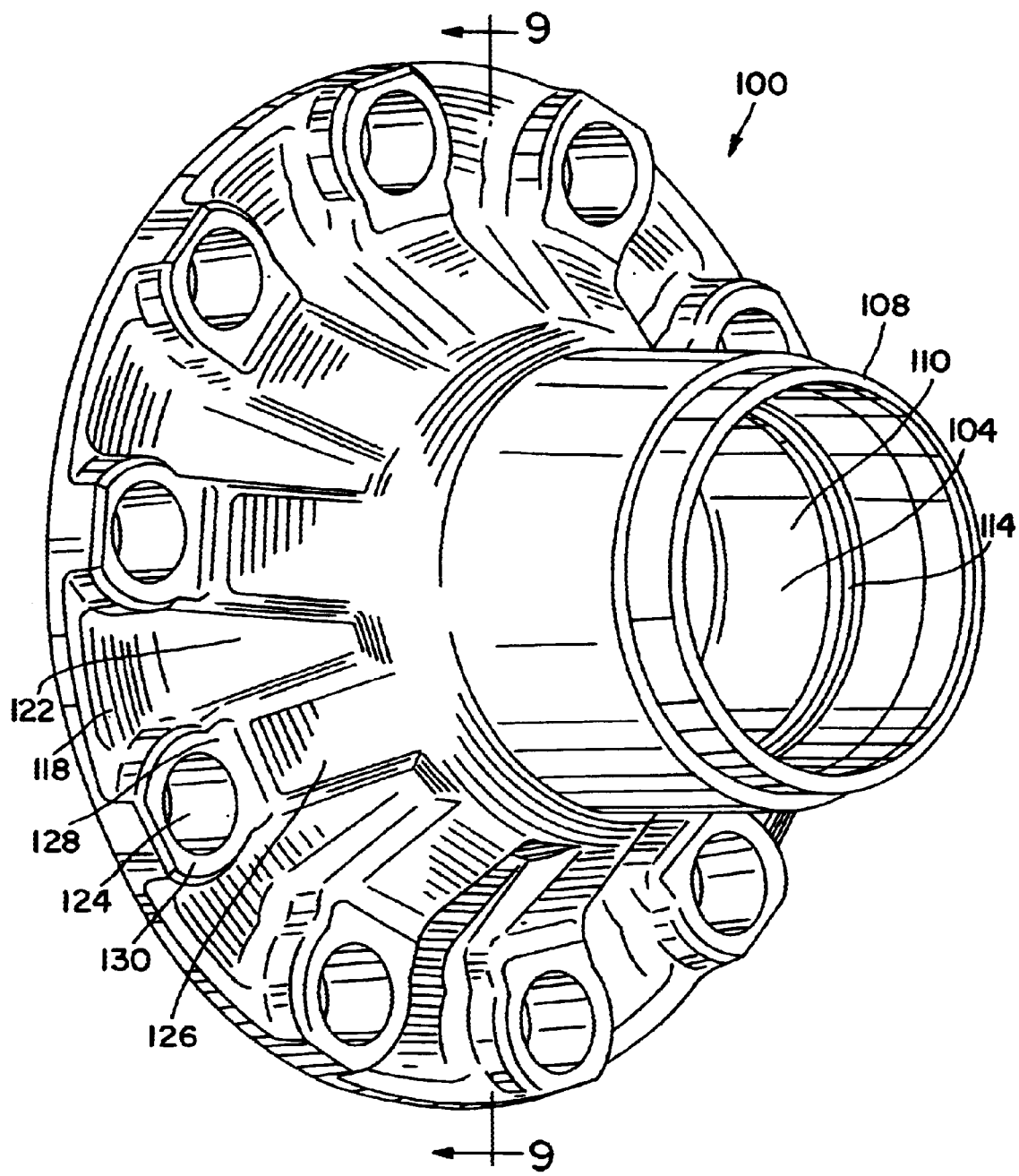
FIG. 2 is a perspective view of the inboard side of the prior art wheel hub illustrated in FIG. 1.
Figure 3:
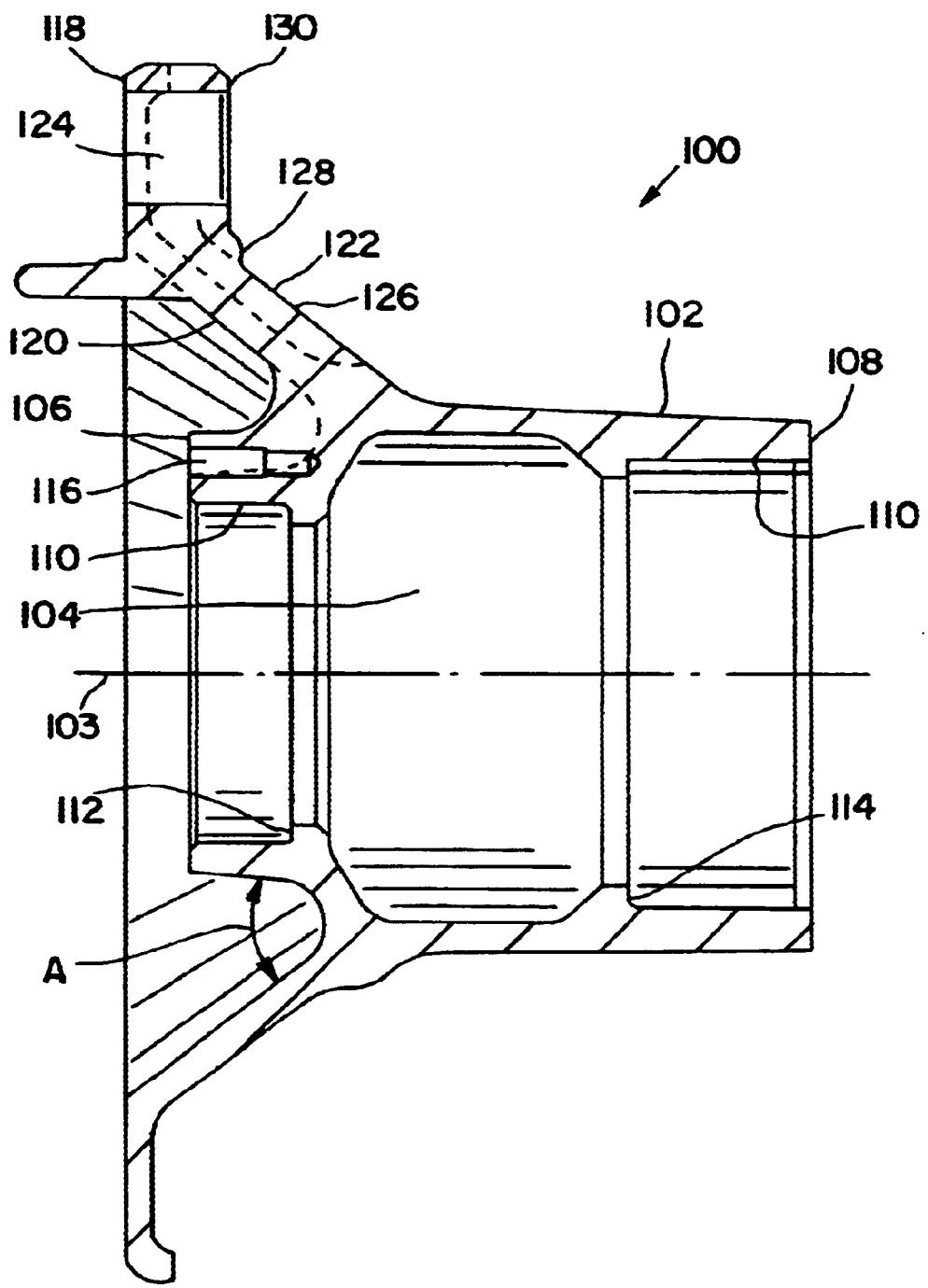
FIG. 3 is a side elevation section view of the prior art wheel hub, as indicated by arrows 3 in FIG. 1.

As shown in FIGS. 1–3, a conventional wheel hub 100 has a roughly cylindrical main body 102, with an axial bore 104 for receiving an axle (not shown). The main body has an outboard end 106 oriented away from the axle and an inboard end 108 oriented toward the axle.

The inner surface 110 of axial bore 104 includes an outer cup 112 and an inner cup 114 for respectively receiving the outboard and inboard roller bearings assemblies that support the axle (not shown). The outboard roller bearing assembly is secured by a cap (not shown), which is typically bolted to outboard end 106. A plurality of bores 116 for receiving the cap bolts are symmetrically disposed about the perimeter of outboard end 106.

Radial flange 118 is connected to and encircles main body 102 at an angle A, which is typically ≦60 degrees relative to centerline 103 of axial bore 104. Radial flange 118 has an outboard side 120, which faces away from the axle and an inboard side 122 which faces toward the axle. The wheel and brake drum (not shown) are secured to the outboard side 120 of radial flange 118 by wheel mounting bolts (not shown). A plurality of apertures 124 for receiving the wheel mounting bolts are symmetrically disposed about the perimeter of radial flange 118.

The prior art wheel hub further includes a plurality of ribs 126, which strengthen and stiffen radial flange 118 to resist the bending load imposed on wheel hub 100 during use. Ribs 126 are radially disposed on the inboard side of radial flange 118 and terminate at apertures 124 for the wheel bolts. The terminal portion 128 of each rib 126 is machined to a flat surface at aperture 124, to provide a boss 130 for receiving the wheel bolts.

Figure 4:
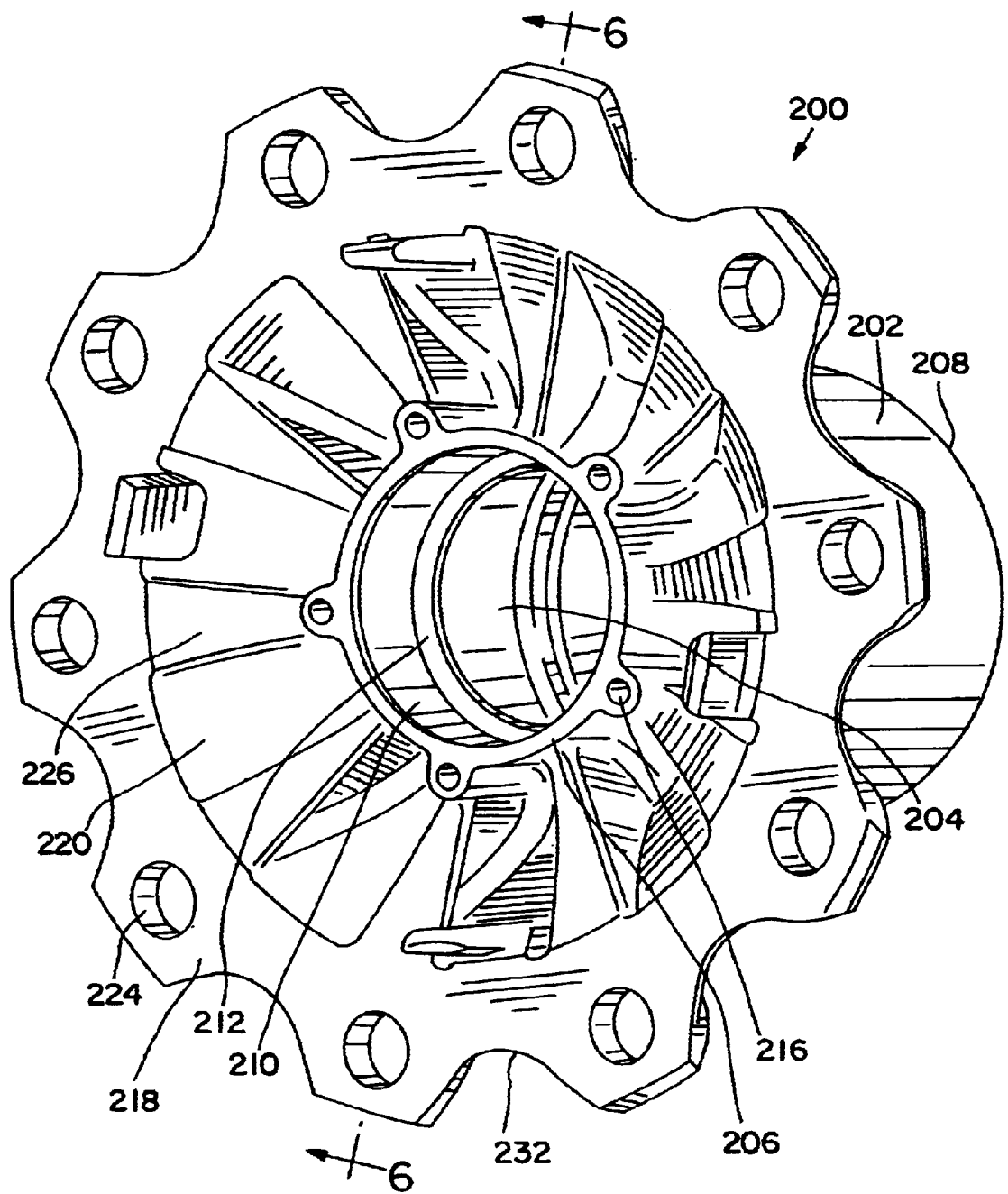
FIG. 4 is a perspective view of the outboard side of the wheel hub of the present invention.
Figure 5:
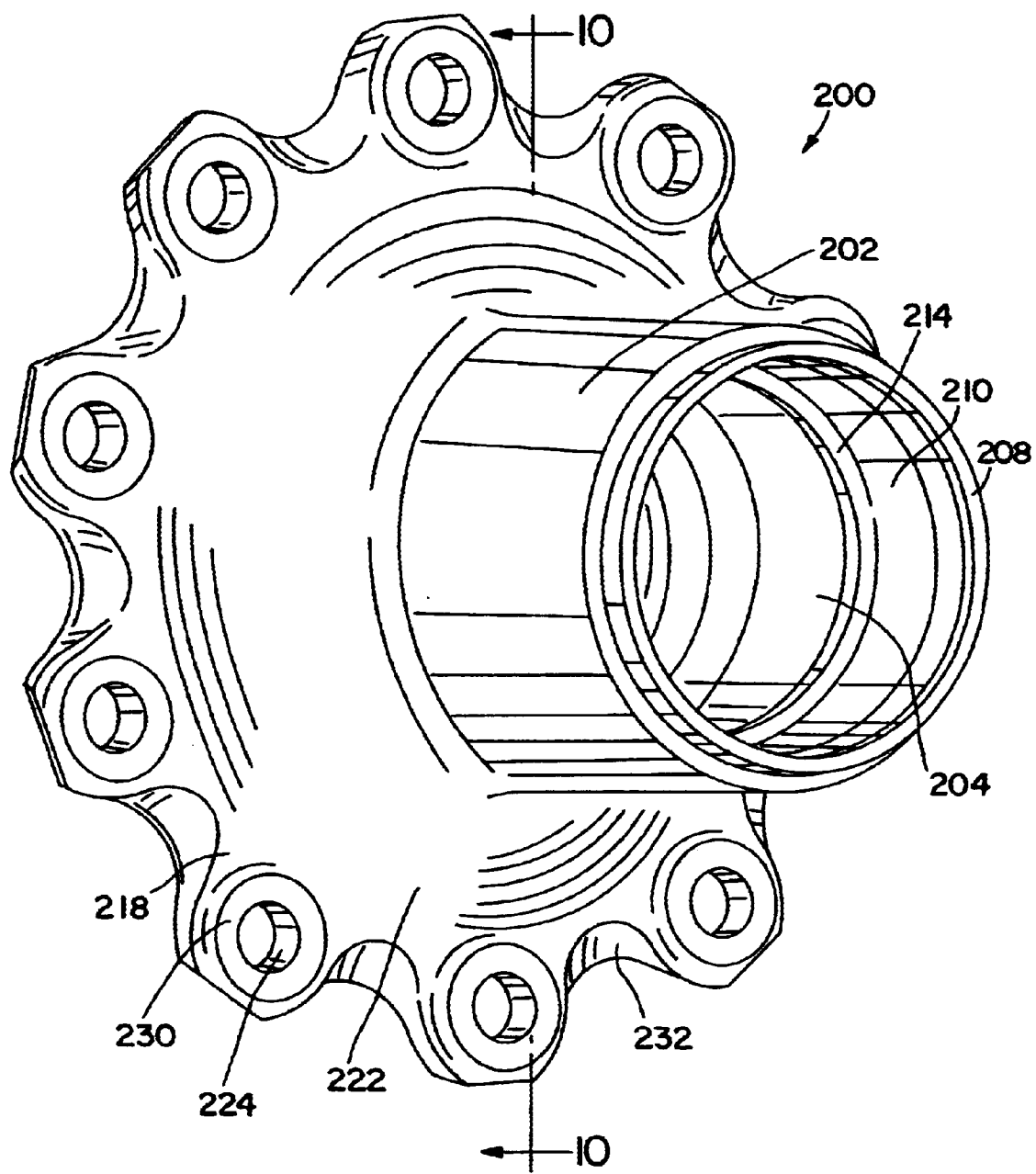
FIG. 5 is a perspective view of the inboard side of the inventive wheel hub illustrated in FIG. 4.
Figure 6:
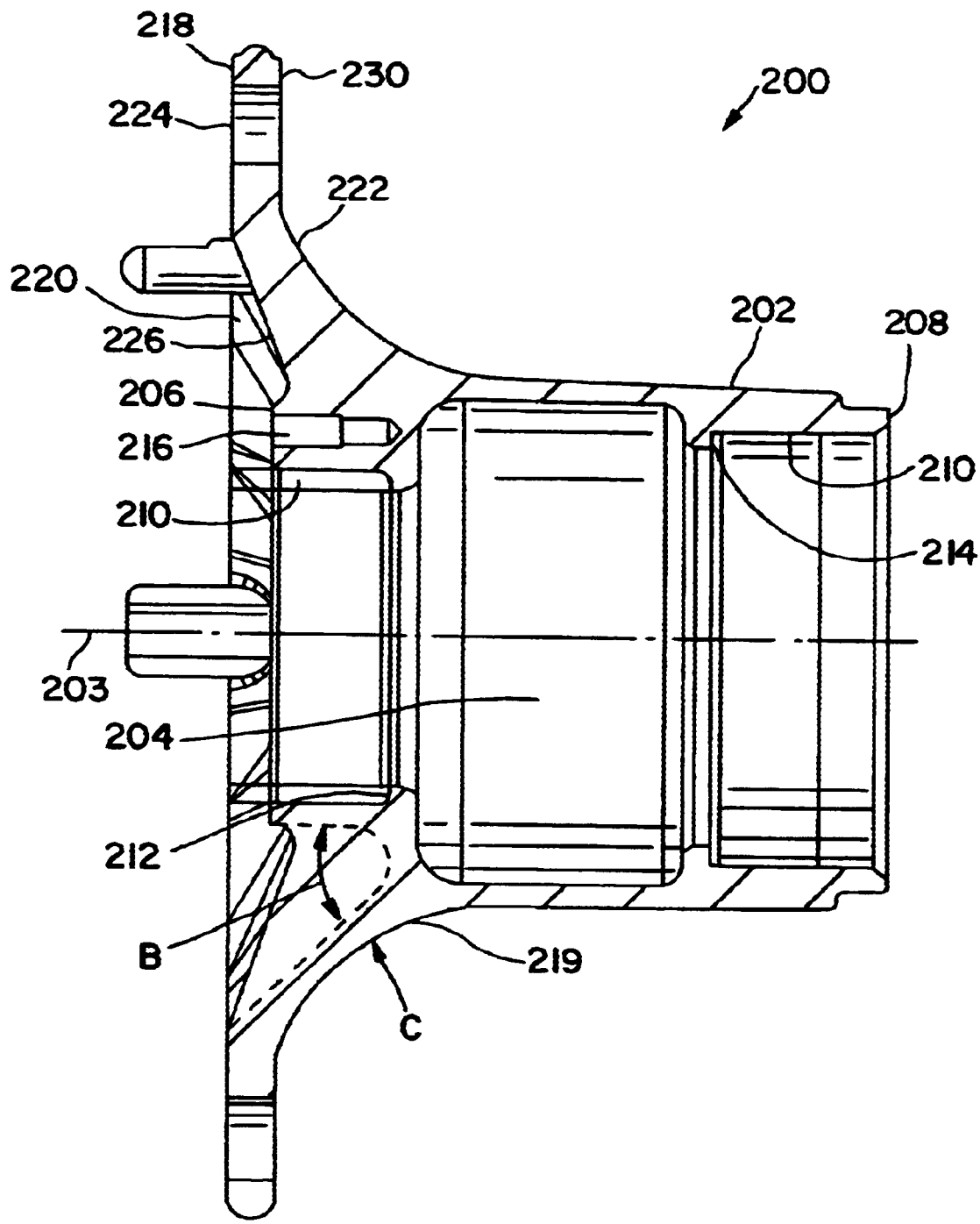
FIG. 6 is a side elevation section view of the inventive wheel hub, as indicated by arrows 6 in FIG. 4.

In contrast to such conventional wheel hub designs, the wheel hub of the present invention has an outboard ribbed structure, rather than the inboard ribbed structure disclosed by the prior art. As shown in FIGS. 4–6, the inventive wheel hub 200 has much of the same overall structure as a conventional wheel hub, to ensure compatibility with other vehicle components, such as the axle, wheel and brake drum. Wheel hub 200 has a generally cylindrical main body 202 with an axial bore 204. The inner surface 210 of axial bore 204 is provided with an outer cup 212 and an inner cup 214 for respectively receiving the outboard and inboard roller bearings assemblies that support the axle (not shown). A plurality of bores 216 are symmetrically disposed about the perimeter of outboard end 206, for fastening the cap which secures the outboard roller bearings. Radial flange 218 is connected to and encircles main body 202 at an angle B, which is approximately 60 degrees, relative to main body 202. A plurality of bosses 230, with apertures 224 for receiving the wheel mounting bolts (not shown), are symmetrically disposed about the perimeter of radial flange 218. In addition, the perimeter 232 of radial flange 218 may be scalloped, to further reduce the weight of the wheel hub.

Unlike conventional wheel hub designs, the inventive wheel hub does not use inboard ribs to strengthen radial flange 218. As shown in FIG. 5, the profile of inboard side 222 of radial flange 218 is a smooth, continuous curve, without sudden and drastic cross-sectional changes that are susceptible to developing cracks under stress. The transition between main body 202 and radial flange 218 is a continuous curve C, with a constant radius.

FIGS. 4–6 depict the inventive wheel hub as embodied by a front steer axle hub, with curve C having a radius of approximately 2.30 inches at the transition 219 from main body 202 to radial flange 218. However, the size and shape of curve C may vary according to the size and load bearing capacity of the wheel hub, as well as other factors.

The outboard side 220 of radial flange 218 is provided with a plurality of radial ribs 226, which extend between axial bore 204 and the radial flange 218, along outboard side 220 of radial flange 218 and outboard end 206 of main body 202. Ribs 226 are symmetrically disposed about outboard side 220 of radial flange 218 and are positioned adjacent to each aperture 224 for the wheel bolts. In addition, at least some of the ribs 226 are positioned adjacent to each bore 216 for the cap bolts. Each of ribs 226 are tapered in width, being broader toward the perimeter of radial flange 218 and becoming progressively narrow toward main body 202.

The size and shape of ribs 126 may vary according to the dimensions of curve C at transition 219 from main body 202 to radial flange 218, the size and load bearing capacity of the wheel hub, as well as other factors.

In an alternative embodiment, the inventive wheel hub may be adapted for use with conventional anti-lock braking systems (ABS). A tone ring which works with the ABS sensor, may be machined directly into the wheel hub or may be assembled onto the wheel hub, as is well known in the art.

It is presently preferred to construct the inventive outboard ribbed wheel hub from cast ductile iron. Using the conventional and inventive front steer axle hubs depicted in FIGS. 1 and 4 as examples, the inventive wheel hub 200 results in a weight savings of approximately 25% in comparison to conventional wheel hub 100. In alternative embodiments, outboard ribbed wheel hub 200 may be constructed of other materials such as aluminum alloys and carbon-fiber composites, providing further weight savings as well as other beneficial charateristics.

The inventive wheel hub provides a number of advantages over prior art designs. In particular, the inventive wheel hub provides superior resistance to the forces experienced during vehicle use, in comparison to conventional wheel hub designs. As a result, the inventive wheel hub may be constructed using less material, to produce a lighter weight wheel hub having the same or better performance than a conventional wheel hub. The reduction in material used to construct the inventive wheel hub provides a corresponding savings in manufacturing costs.

In addition, the use of the lighter weight inventive wheel hub reduces the overall weight of a vehicle, particularly in the case of vehicles such as tractor-trailers used in commercial freight hauling that may have as many as 18 or more wheel hubs. Because the overall loaded weight of commercial vehicles is restricted by state and federal regulations, the reduction in the unloaded or tare weight of a vehicle provided by use of the inventive wheel hub results in a direct increase in the amount of freight that can be hauled by such vehicles. Thus, in addition to reducing manufacturing costs, the use of the lighter weight inventive wheel hub also provides an increase in the efficiency of commercial freight hauling operations.

A wheel hub under load experiences compressive forces that are oriented radially to the main body, normal to the centerline of the axial bore. However, in prior art designs, inboard ribs 126 follow the angle A of radial flange 118, which is typically $\leq 60$ degrees relative to the centerline 103 of the axial bore 104. Thus, the prior art inboard ribs 126 are positioned at an angle to the direction of the compressive force experienced by wheel hub 100. As a result, inboard ribs 126 do not directly resist the compressive force, but rather, are subject to a bending load and operate as cantilever beams to resist the compressive force on wheel hub 100.

In contrast, outboard ribs 226 of the inventive wheel hub are disposed radially about wheel hub 200, normal to centerline 203 of axial bore 204. Thus, outboard ribs 226 are oriented in the same direction as the compressive force on wheel hub 200. As a result, outboard ribs 226 are subject to a direct compression load, much like the columns of a building supporting the weight above them.

In general, structures are more efficient at resisting compression loads than bending loads. Thus, the inventive wheel hub is more efficient than conventional wheel hub designs in resisting the compressive force exerted on a wheel hub during vehicle use. Consequently, the inventive wheel hub requires less material to construct than conventional wheel hub designs. The increased resistance to compression loads provided by the inventive wheel hub in comparison to conventional wheel hub designs, may be illustrated by calculating the section modulus of the respective wheel hubs, as discussed in the Example below.

EXAMPLE

A comparison between a conventional wheel hub and the inventive wheel hub, with respect to resistance to bending and torsional stress, was performed by determining the section modulus of hypothetical conventional and inventive wheel hubs of equivalent weight. Mathematical models of the conventional wheel hub and the inventive wheel hub were used to calculate the section modulus of each design. For purposes of comparison, the model of the inventive wheel hub was based generally on the design of a conventional wheel hub, by removing the inboard ribs and replacing them with outboard ribs, while maintaining the same volume of material, wall thickness and weight. Consequently, the models provide a direct comparison between the location of the ribs on the inboard side, as in a conventional wheel hub, versus the location of the ribs in the outboard side, as in the inventive wheel hub.

The section modulus (Area Moment of Inertia/Distance from the Centroid) of the conventional and inventive wheel hubs was calculated using 3-D solid modeling computer software, such as ProENGINEER (Parametric Technologies Corp., Waltham, Mass.), as is well known in the art. The higher the section modulus for a given weight of material, the better the wheel hub is able to resist bending and torsional stresses.

The results of these calculations are presented below in Table 1:

TABLE 1

|  | Section Modulus (in.$^3$) | Weight (lbs.) |
| --- | --- | --- |
| Conventional Design | 27.83 | 28.35 |
| Inventive Design | 31.06 | 28.34 |

As demonstrated by the results in Table 1, the section modulus of the inventive wheel hub is 11% higher than the section modulus of a conventional wheel hub of the same weight. The increased section modulus provided by the inventive wheel hub translates into an 11% increase in resistance to torsional and bending stresses in comparison to a conventional wheel hub. Thus, the inventive wheel hub may be constructed using less material and having lighter weight than a conventional wheel hub having the same resistance to torsional and bending stresses.

The inventive wheel hub also provides the advantage of eliminating the stress concentrations created by the inboard rib design of conventional wheel hubs. Sudden and drastic cross-sectional changes in the profile of a radial flange create stress concentrations that increase susceptibility to metal fatigue and wear. In particular, the terminal portion 128 of ribs 126 of conventional wheel hub 100 are machined to provide bosses 130 for the wheel bolts. The change in profile created by machining ribs 126 creates stress concentrations at the junction between ribs 126 and bosses 130.

Figure 7:
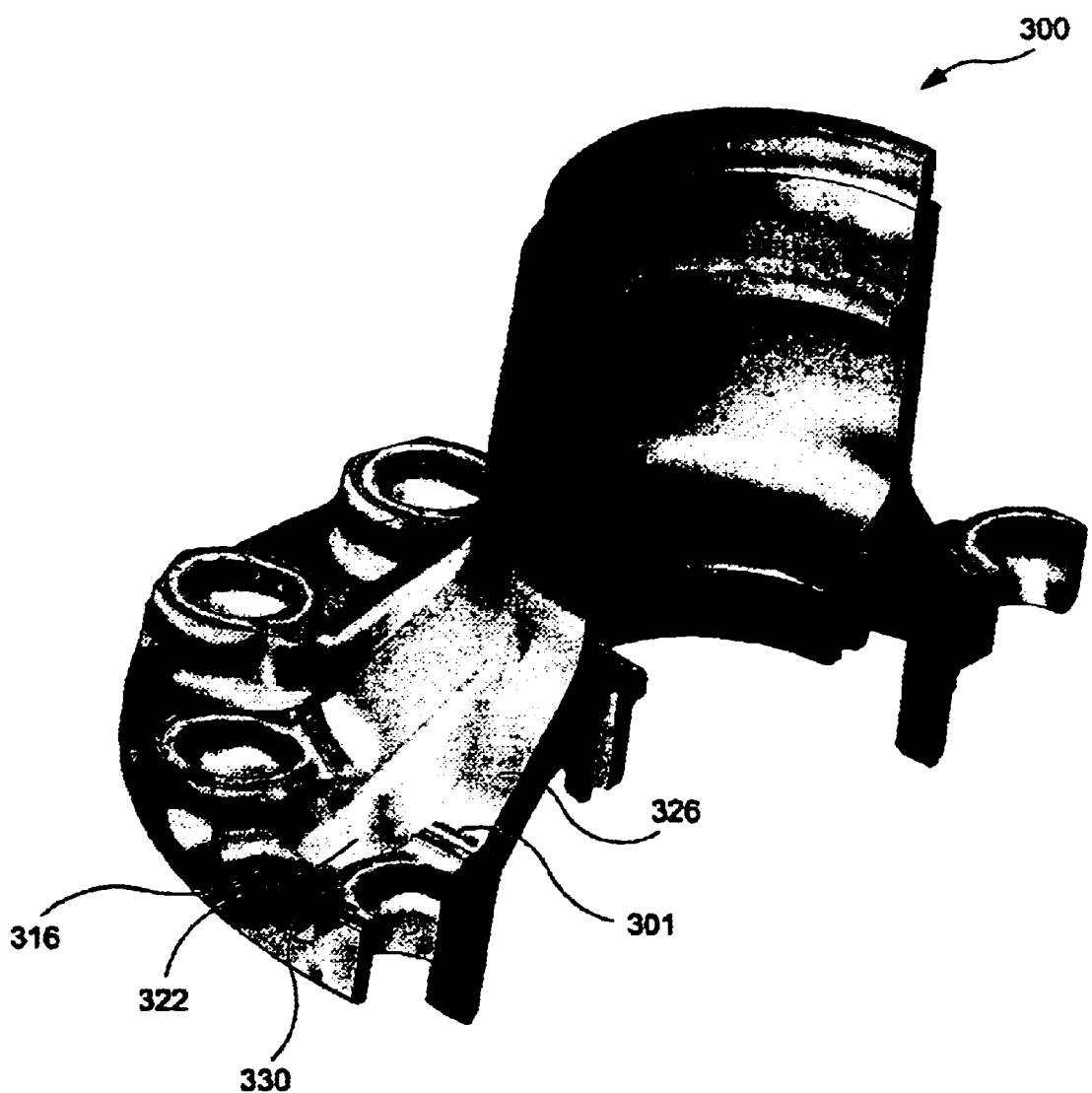
FIG. 7 is a finite element analysis stress model of a prior art wheel hub.

FIG. 7 depicts a finite element analysis stress model of conventional wheel hub 300, calculated using finite element analysis computer software, such as Cosmos (Structural Research and Analysis Corp., Los Angeles, Calif.), as is well known in the art. As FIG. 7 shows, stress concentrations 301 (depicted as bright regions in the stress model) are created by the sudden change in cross-section at the junction between ribs 326 and bosses 330 on the inboard side 322 of radial flange 318.

Figure 8:
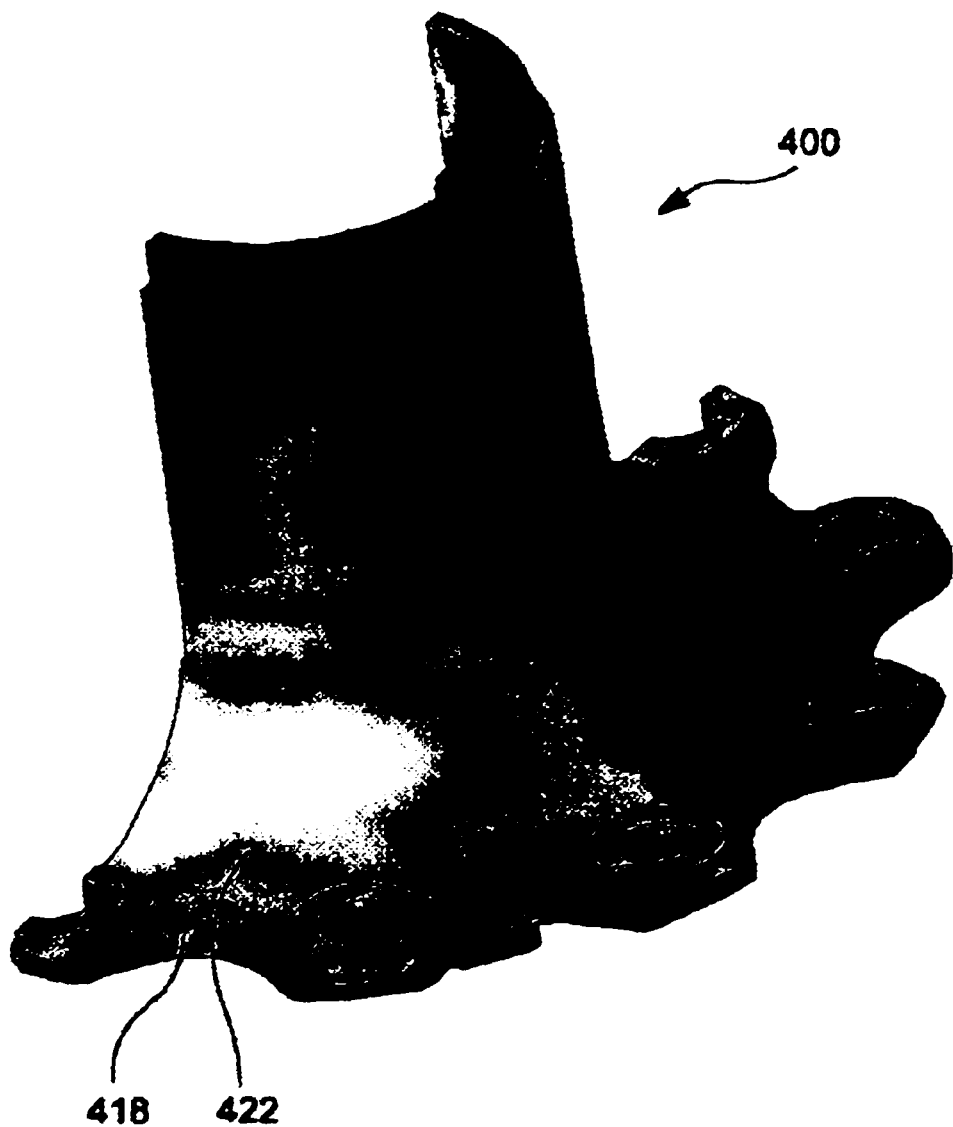
FIG. 8 is a finite element analysis stress model of the wheel hub of the present invention.

In contrast, FIG. 8 depicts a finite element analysis stress model of the inventive wheel hub 400, wherein inboard side 422 of radial flange 418 is a smooth, continuous curve, without sudden changes in cross-section. As is readily apparent from FIG. 8, the smooth, continuous profile of the inventive wheel hub eliminates the stress concentrations produced by the conventional wheel hub design.

The inventive wheel hub also provides other structural advantages over conventional wheel hubs. The inventive wheel hub provides increased resistance to deformation of the wheel hub caused by twisting of the axle, in comparison to conventional wheel hub designs. This reduces the incidence of hub cap deflection and oil leaks.

During operation of the vehicle, the axle is subject to forces which tend to twist the axle away from the axis of rotation within axial bore 104, producing stress on wheel hub 100. In conventional wheel hubs, this twisting stress tends to deform the shape of outboard and inboard ends 106 and 108 of main body 102 of wheel hub 100, loosening the fit of the roller bearing assemblies within the inner and outer cups 112 and 114 of the axial bore.

As shown in FIG. 3, the design of conventional wheel hub 100 does not provide any support for the outboard end 106 of main body 102 and, in particular, for the portion of outboard end 106 containing outer cup 112. In contrast, as shown in FIG. 6, the outboard end 206 is supported by ribs 226 in the inventive wheel hub 200.

Figure 9:
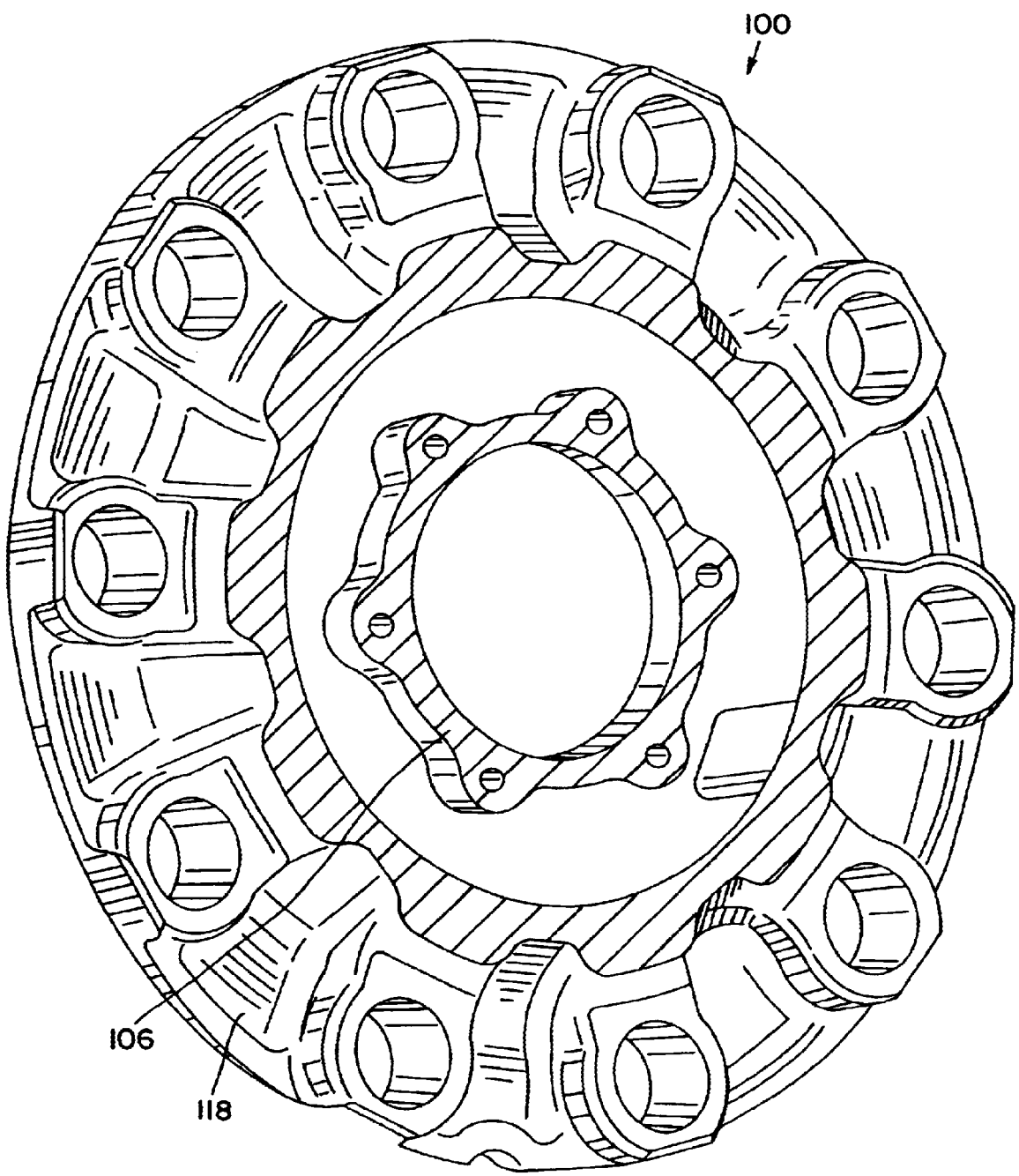
FIG. 9 is a perspective view of a slice through the radial flange and outboard end of the main body of a prior art wheel hub, as indicated by arrows 9 in FIG. 2.
Figure 10:
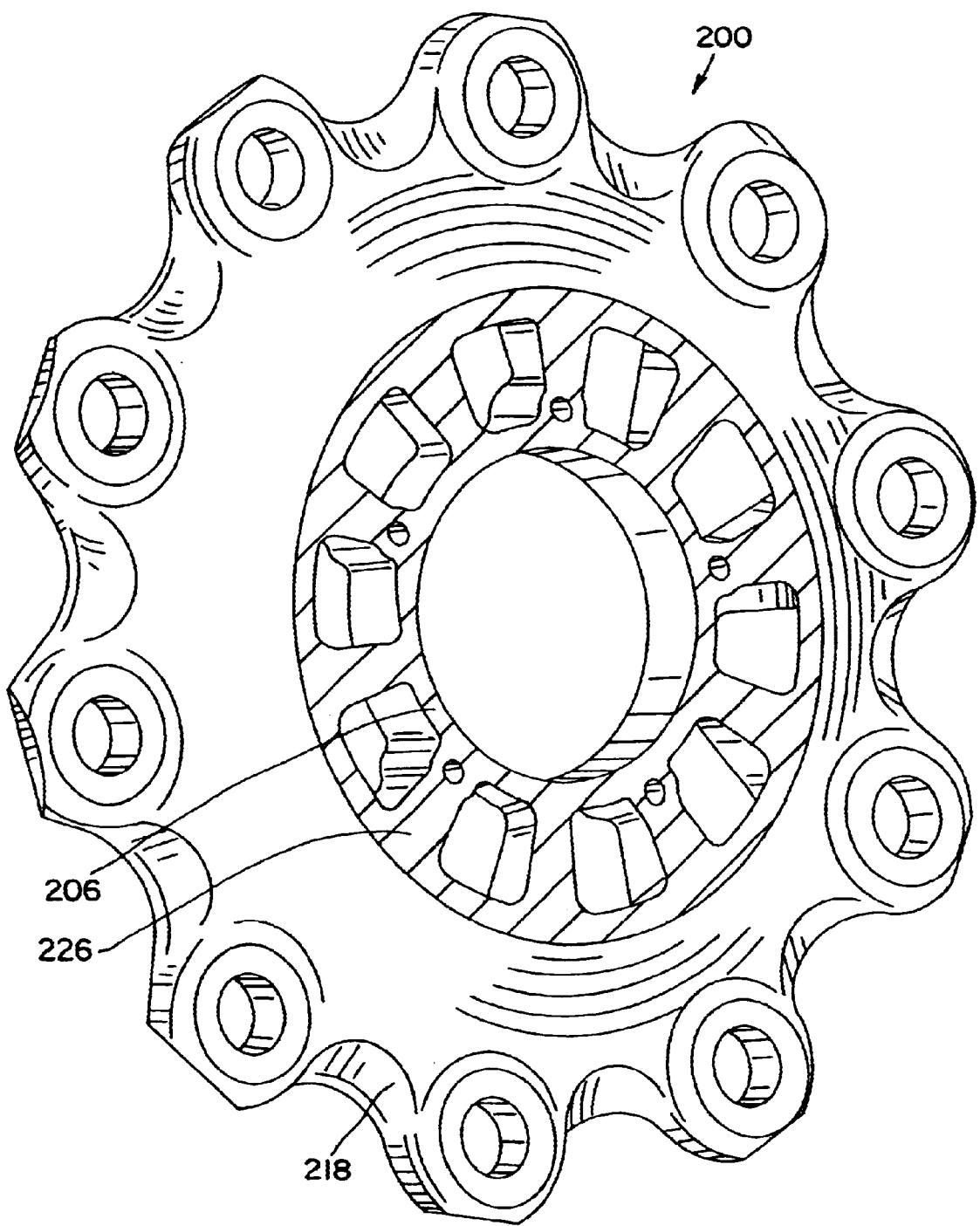
FIG. 10 is a perspective view of a slice through the radial flange and outboard end of the main body of the wheel hub of the present invention, as indicated by arrows 10 in FIG. 5.

This difference between conventional wheel hub 100 and inventive wheel hub 200 is further illustrated in FIGS. 9 and 10. FIG. 9 depicts a slice through outboard end 106 and radial flange 118 of conventional wheel hub 100, as indicated by arrows 9 in FIG. 2. As is readily apparent, outboard end 106 appears as an unsupported ring within the center of radial flange 118. In contrast, FIG. 10 depicts a similar slice through outboard end 206 and radial flange 218 of the inventive wheel hub 200, as indicated by arrows 10 in FIG. 5. In this case, outboard end 206 is supported within the center of radial flange 218 by ribs 226. The support provided by ribs 226 results in increased resistance to twisting of the axle, thereby reducing deformation of outboard end 206.

Similarly, the inventive wheel hub also has increased the resistance to deformation of the inner cup at the inboard end, caused by twisting of the axle. As discussed, above, ribs 126 of conventional wheel hub 100 increase the stiffness of radial flange 126, without providing any support for the main body. As radial flange 126 becomes stiffer, twisting of the axle results in increasing stress on the outboard and inboard ends 106 and 108 of main body 102. Consequently, ribs 126 result in increased deformation of inner cup 114 caused by twisting of the axle. In contrast, the outboard ribs 226 of the inventive wheel hub provide support for main body 202, thereby increasing resistance to twisting of the axle and reducing deformation of inner cup 214.

It will be apparent to those skilled in the art that changes and modifications may be made in the embodiments illustrated herein, without departing from the spirit and the scope of the invention. Thus, the invention is not to be limited to the particular forms herein shown and described except insofar as indicated by the scope of the appended claims.

What is claimed is:

1. A wheel hub comprising:

a cylindrical main body, a radial flange and a plurality of radial ribs;

said main body has an outboard end and an inboard end, and said radial flange has an outboard side and an inboard side; and said radial flange is connected to and encircles said main body, said radial ribs extending between said outboard side of said radial flange and said outboard end of said main body.

2. The wheel hub of claim 1, wherein the profile of said inboard side of said radial flange defines a smooth, continuous curve.

3. The wheel hub of claim 1, wherein the perimeter of said radial flange is scalloped.

4. A wheel hub comprising a cylindrical main body, a radial flange and a plurality of ribs, wherein:

said main body has an outboard end and an inboard end, and said radial flange has an outboard side and an inboard side;

said radial flange is connected to and encircles said main body, said ribs extending between said outboard side of said radial flange and said outboard end of said main body; and said inboard side of said radial flange defines a smooth, continuous curve.

5. The wheel hub of claim 4, wherein the perimeter of said radial flange is scalloped.

6. A wheel hub comprising:

a main body, said main body having an axial bore, an outboard end and an inboard end;

a radial flange;

at least one rib extending between said axial bore and said radial flange; and a plurality of wheel bolt apertures in said radial flange, and wherein a rib is adjacent each said wheel bolt aperture.

7. A wheel hub comprising:

a main body having an axial bore, an outboard end and an inboard end, and said axial bore has a centerline extending longitudinally through the axial bore;

a flange extending radially from said main body; and at least one rib extending between said flange and said axial bore, said rib oriented radially relative to said axial bore and at least a length of said rib is normal to the centerline.

8. The wheel hub of claim 7, wherein said rib is tapered in width.

9. The wheel hub of claim 7, wherein said radial flange has an inboard side and an outboard side, said inboard side defining a smooth continuous curve.

10. The wheel hub of claim 7, further comprising at least one wheel bolt aperture in said radial flange, and said rib is positioned adjacent to said wheel bolt aperture.

* * * * *